US008918973B2

(12) United States Patent
Kang

(10) Patent No.: US 8,918,973 B2
(45) Date of Patent: Dec. 30, 2014

(54) TOOL FOR DETACHING PISTON BOLT FROM CYLINDER

(71) Applicant: Hsin-Fa Kang, Tainan (TW)

(72) Inventor: Hsin-Fa Kang, Tainan (TW)

(73) Assignee: Jui-Deng Industrial Corp., Yung Kang, Tainan (TW)

( * ) Notice: Subject to any disclaimer, the term of this patent is extended or adjusted under 35 U.S.C. 154(b) by 224 days.

(21) Appl. No.: 13/726,563

(22) Filed: Dec. 25, 2012

(65) Prior Publication Data

US 2014/0173866 A1 Jun. 26, 2014

(51) Int. Cl.
*B23P 19/04* (2006.01)
*B25B 27/06* (2006.01)

(52) U.S. Cl.
CPC .................................... *B25B 27/062* (2013.01)
USPC ............................................................ 29/263

(58) Field of Classification Search
USPC ............................... 29/244–282; 269/3, 6, 95
See application file for complete search history.

(56) References Cited

U.S. PATENT DOCUMENTS

| | | | | |
|---|---|---|---|---|
| 6,601,279 | B2 * | 8/2003 | Scott | 29/259 |
| 8,578,578 | B2 * | 11/2013 | Melanson | 29/272 |
| 2003/0188410 | A1 * | 10/2003 | English | 29/263 |

* cited by examiner

*Primary Examiner* — Lee D Wilson
*Assistant Examiner* — Nirvana Deonauth

(57) ABSTRACT

A tool for detaching piston bolt from cylinder consists of a threaded rod, a grip, a positioning member, a positioning sleeve, a supporting member and a nut. The threaded rod possesses a joint end formed with a fixing surface, a resting portion located next to the joint end with no threads. The grip is bored with a first threaded hole, and a second threaded hole vertically communicating with the first threaded hole and engaged with a fixing screw pressing on the fixing surface. By using the tool to detach a bolt, it's not only a user's fingers won't be injured, but also the bolt can be smoothly and swiftly removed from a joint of a piston and a connecting rod.

3 Claims, 7 Drawing Sheets

TOOL FOR DETACHING PISTON BOLT FROM CYLINDER

BACKGROUND OF THE INVENTION

1. Field of the Invention

This invention relates to a tool for detaching piston bolt from cylinder, particularly to a tool which is capable of steadily and quickly removing a bolt from a joint connecting a piston and a connecting rod without injuring a user's fingers while working.

2. Description of the Prior Art

Commonly, the piston in an engine cylinder is pivotally jointed with a connecting rod by a bolt, which is conventionally removed from a bolt hole by hammering a tool (such as a steel bar) positioned exactly in the bolt hole, with the piston fixed by a pliers, so as to separate the piston from the connecting rod. The way is inconvenient for using and possible to damage the piston or the connecting rod if not working cautiously or properly. Hence, as shown in FIG. 1, a conventional removing tool 1 has been disclosed, mainly including a threaded rod 10. The threaded rod 10 is fully provided with threads 100, with one end threadably engaged with a grip 11, with an intermediate portion threadably engaged with a positioning member 12, with a positioning sleeve 13 fitted to attach on a recessed flat surface 120 cut in the positioning member 12. The threaded rod 10 is further provided with a fixing end 101 located at another end and sleeved with a supporting member 14. Finally a nut 15 is threadably engaged with the fixing end 101 outside the supporting member 14.

And, as shown in FIG. 2, when a piston 20 is to be separated from a connecting rod 21, the threaded rod 10 is first inserted into a through hole 220 of a piston bolt 22, with the fixing end 101 extended out of the piston bolt 22. Next, the supporting member 14 is fitted with the fixing end 101 and the nut 15 is successively engaged with the fixing end 101, with the supporting member 14 leaning on one end of the piston bolt 22. Then the positioning member 12 can be rotated to move along the threaded rod 10, simultaneously pushing the positioning sleeve 13 to move until contacting on a wall of the piston 20. By the time, with the positioning member 12 and the positioning sleeve 13 positioned and resting on the piston 20, with the supporting member 14 and the nut 15 positioned and restricting the piston bolt 22, the piston bolt 22 can be moved out of the piston 20 into an accommodating groove 130 of the positioning sleeve 13 while rotating the grip 11. As the piston bolt 22 is completely removed from the piston 20 and bolt holes 200 and 210 of the connecting rod 21, the connecting rod 21 is able to be separated from the piston 20. However, as the threaded rod 10 is fully covered with the threads 100, a user's fingers holding on the threaded rod 10 may be wounded because of friction with the threads 100 while holding the grip 11 to work. Moreover, with a threaded hole 110 of the grip 11 threadably engaged with the threads 100 of the threaded rod 10, as the grip 11 is reversely wheeled, it may rotate outwards to come off the threaded rod 10, inconvenient for using.

SUMMARY OF THE INVENTION

The object of this invention is to offer a tool for detaching piston bolt from cylinder, capable of removing a bolt out of a joint connecting a piston and a connecting rod steadily and quickly without injuring while working.

Tool for detaching piston bolt from cylinder is composed of a threaded rod, a grip, a positioning member, a positioning sleeve, a supporting member and a nut. The threaded rod is provided with first threads, a joint end located at one end with second threads, a fixing end located at another end with third threads. The grip is threadably connected with the joint end of the threaded rod, provided with a first threaded hole. The positioning member is threadably engaged with the threaded rod, provided with a recessed flat surface, a threaded through hole bored through the recessed flat surface. The positioning sleeve is threadably engaged with the threaded rod, with one end attached on the recessed flat surface of the positioning member. The positioning member is provided with an accommodating groove bored through one end, a through hole bored through another end to communicate with the accommodating groove. The supporting member is fitted with the fixing end of the threaded rod, bored with a through hole. The nut is screwed with the fixing end of the threaded rod.

The tool of the invention is characterized by providing a fixing surface on the joint end of the threaded rod, a resting portion formed next to the joint end without threads, a second threaded hole bored in the grip to vertically communicate with the first threaded hole, a fixing screw employed to threadably engage with the second threaded hole to press on the fixing surface of the threaded rod.

Further, the resting portion of the threaded rod is marked with a symbol axially aligned with the fixing surface of the threaded rod so as to conduct the second threaded hole of the grip to exactly face to the fixing surface of the threaded rod, namely for a fixing screw to exactly press on the fixing surface.

Further, the fixing screw of the grip is provided with a hexagonal recess cut in a top for a hexagonal tool to fit in.

BRIEF DESCRIPTION OF DRAWINGS

This invention is better understood by referring to the accompanying drawings, wherein.

DETAILED DESCRIPTION OF THE PREFERRED EMBODIMENT

Figure 1:
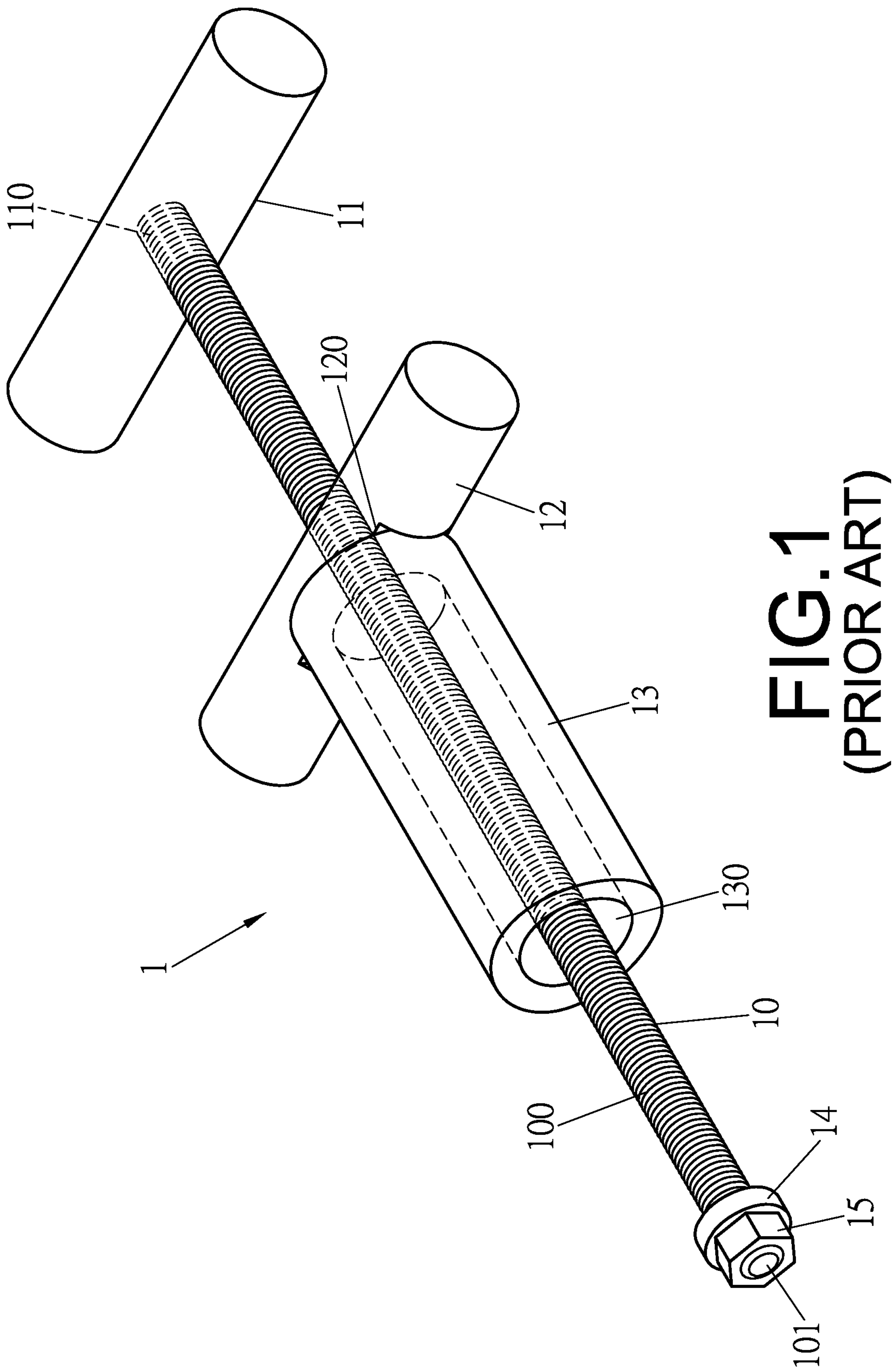
FIG.1 (PRIOR ART)
FIG. 1 is a perspective view of a conventional tool for detaching piston bolt from cylinder.
Figure 2:
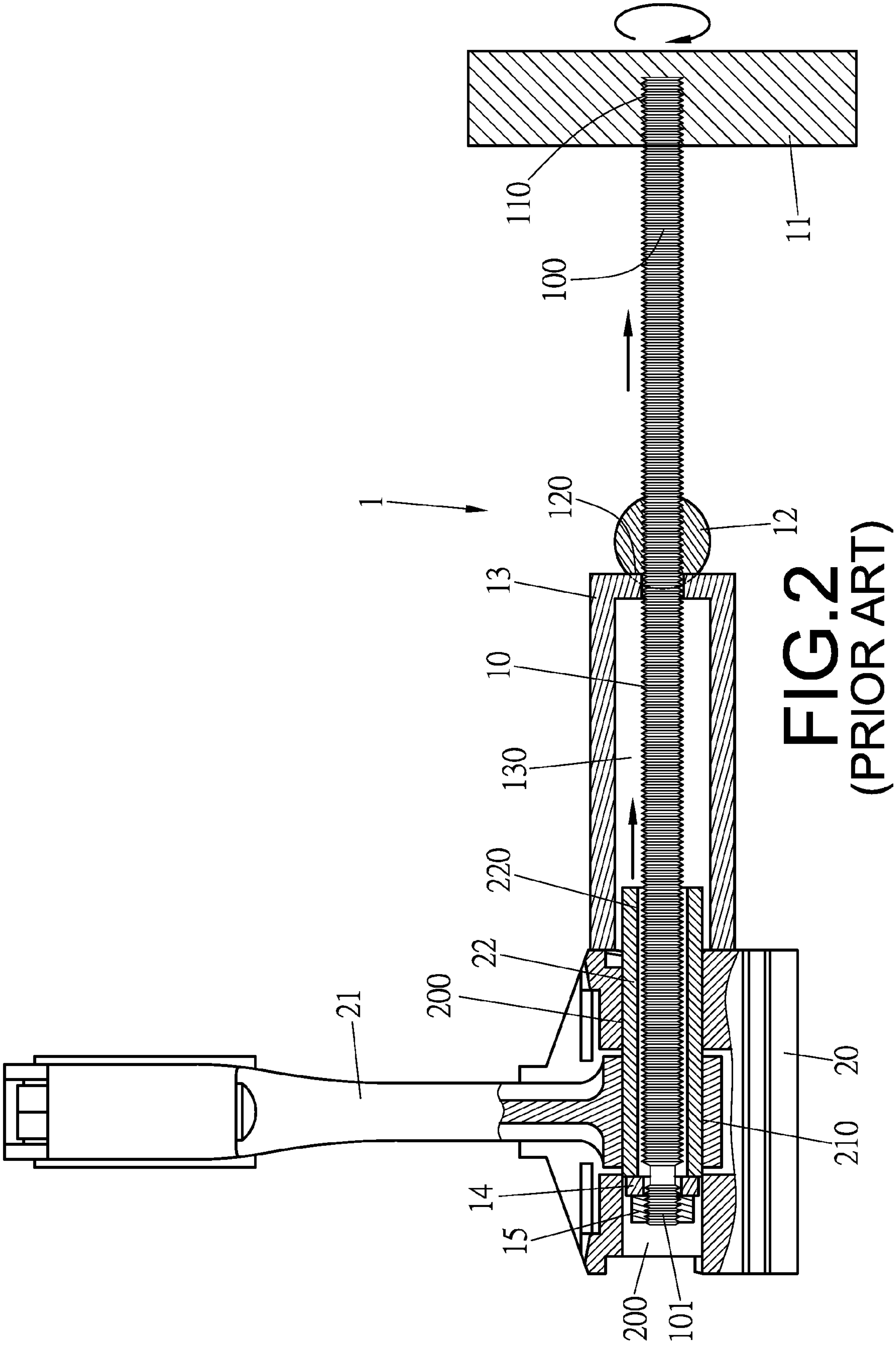
FIG.2 (PRIOR ART)
FIG. 2 is a cross-sectional view of the conventional tool for detaching piston bolt from cylinder, showing it being operated.
Figure 3:
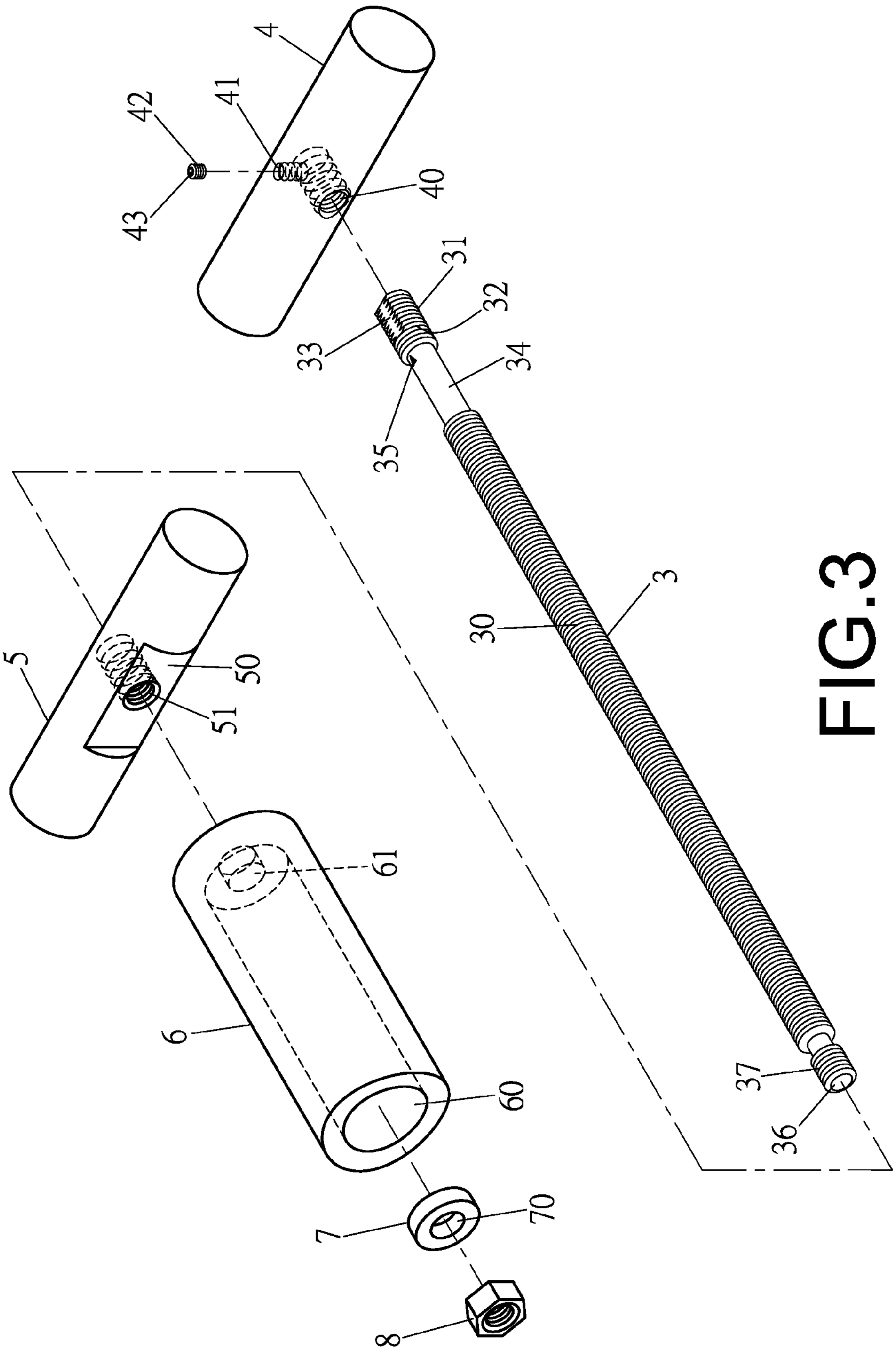
FIG. 3 is an exploded perspective view of a preferred embodiment of a tool for detaching piston bolt from cylinder in the present invention.
Figure 4:
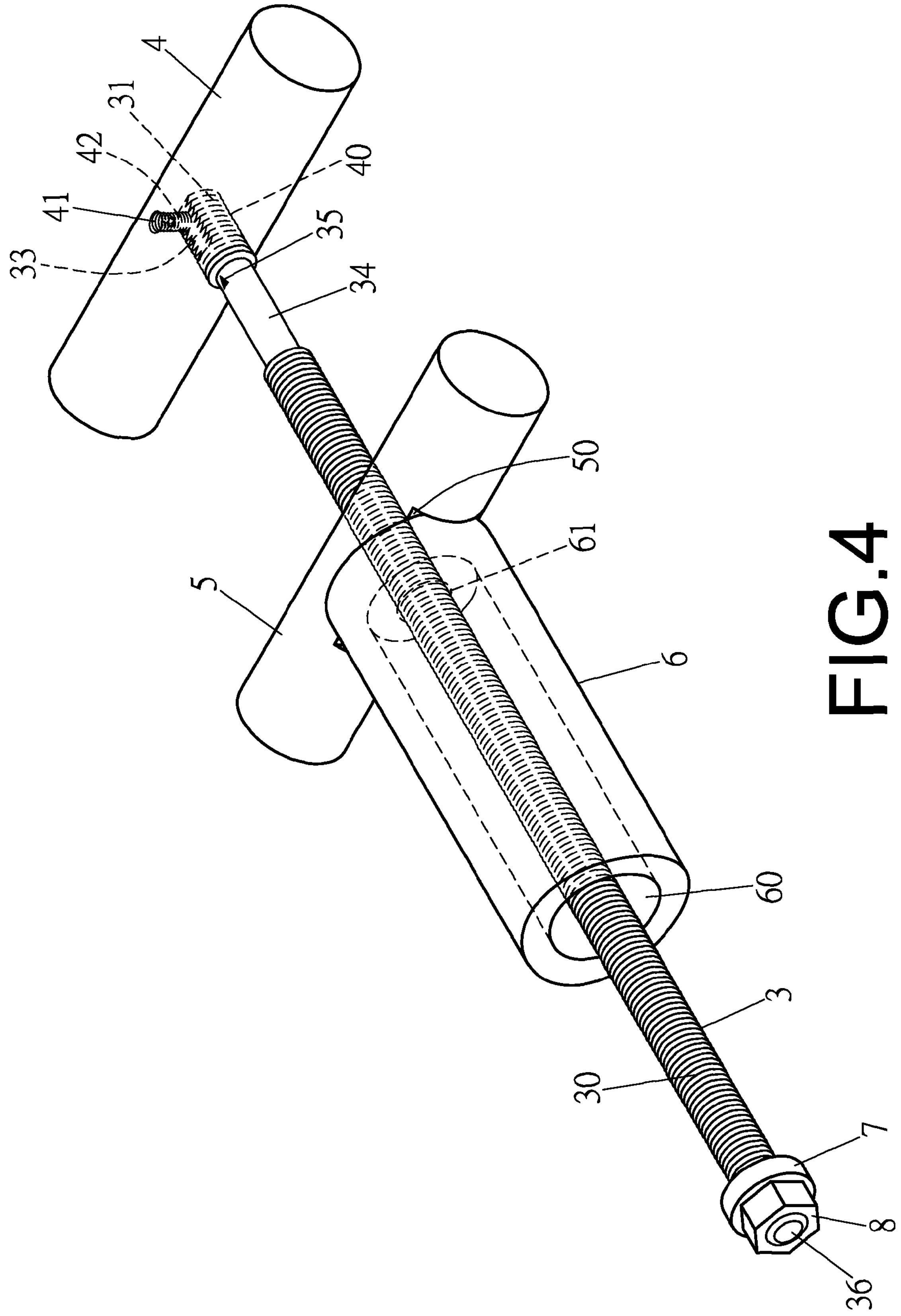
FIG. 4 is a perspective view of the preferred embodiment of a tool for detaching piston bolt from cylinder in the present invention.

As shown in FIGS. 3 and 4, a preferred embodiment of a tool for detaching piston bolt from cylinder in the present invention includes a threaded rod 3, a grip 4, a positioning member 5, a positioning sleeve 6, a supporting member 7 and a nut 8.

The threaded rod 3 is provided with first threads 30, a joint end 31 having second threads 32 and a fixing surface 33, a resting portion 34 located between the first threads 30 and the joint end 31 with no threads, a symbol 35 marked on the resting portion 34, and a fixing end 36 having third threads 37.

The grip 4 is threadably connected with the joint end 31 of the threaded rod 3, provided with a first threaded hole 40, and a second threaded hole 41 bored vertically to communicate with the first threaded hole 40. A fixing screw 42 is employed to engage with the second threaded hole 41 to press on the fixing surface 33 of the threaded rod 3, with a top cut with a hexagonal recess 43.

The positioning member 5 is threadably engaged with the threaded rod 3, provided with a recessed flat surface 50 and a threaded through hole 51 bored through the recessed surface 50.

The positioning sleeve 6 is threadably engaged with the threaded rod 3, with one end attached on the recessed flat surface 50 of the positioning member 5. The positioning member 6 is provided with an accommodating groove 60 bored through one end of the positioning member 6, and a through hole 61 bored through another end to communicate with the accommodating groove 60.

The supporting member 7 is fitted with the fixing end 36 of the threaded rod 3, bored with a through hole 70.

The nut 8 is screwed with the fixing end 36 of the threaded rod 3 next to the supporting member 7.

In assembly, as shown in FIGS. 3 and 4, the joint end 31 of the threaded rod 3 is first threadably engaged with the first threaded hole 40 of the grip 4, with the second threaded hole 41 of the grip 4 exactly aiming at the symbol 35 on the resting portion 34 so as to enable the second threaded hole 41 to exactly face to the fixing surface 33 of the threaded rod 3. The fixing screw 42 is next screwed into the second threaded hole 41 to press on the fixing surface 33 of the threaded rod 3, making the grip 4 stably fixed on the threaded rod 3 without rotating along the threaded rod 3. Successively, the positioning member 5 and the positioning sleeve 6 are fitted with the threaded rod 3. The supporting member 7 is fitted with the fixing end 36 of the threaded rod 3 and the nut 8 is threadably engaged with the fixing end 36.

Figure 5:
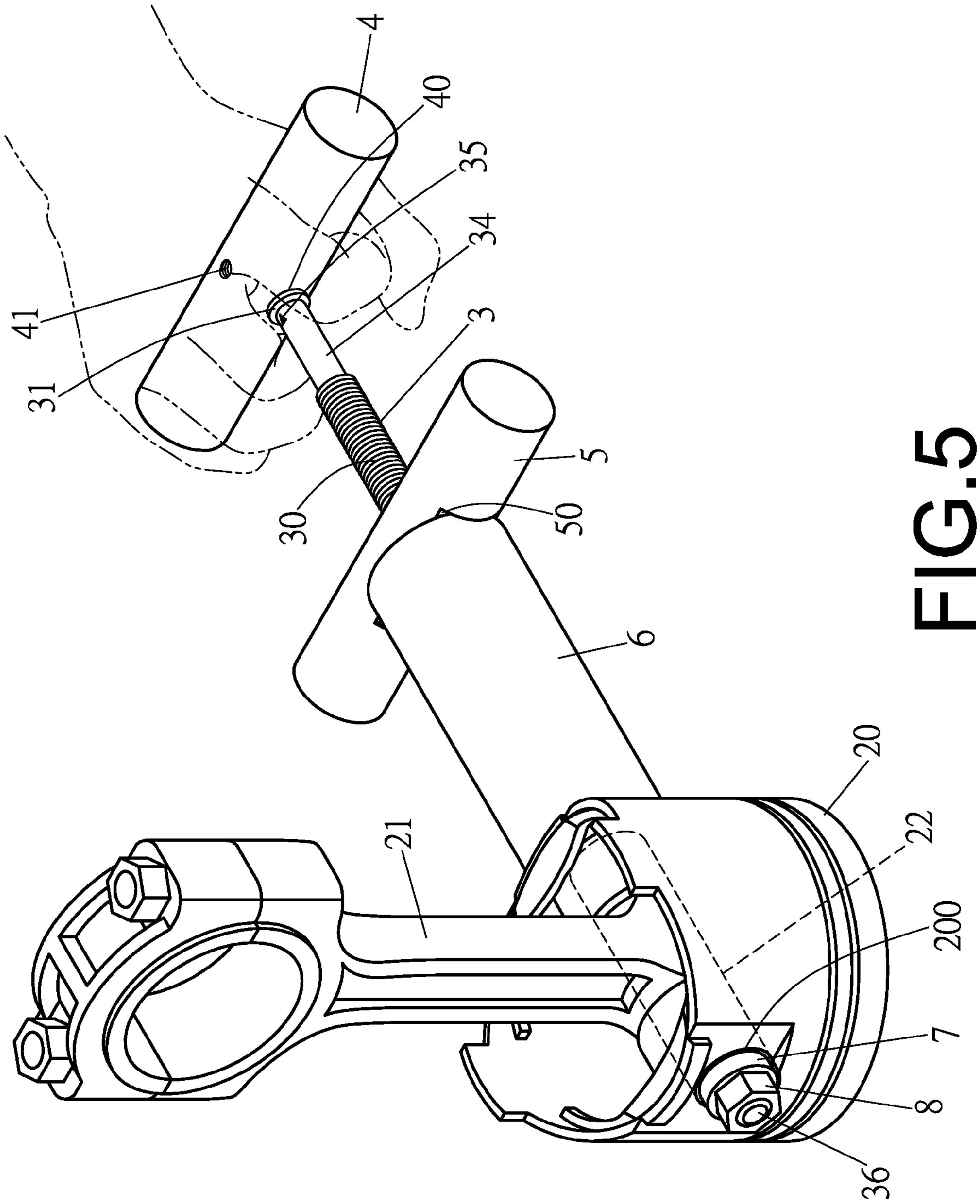
FIG. 5 is a perspective view of the preferred embodiment of a tool for detaching piston bolt from cylinder in the present invention, showing it being operated.
Figure 6:
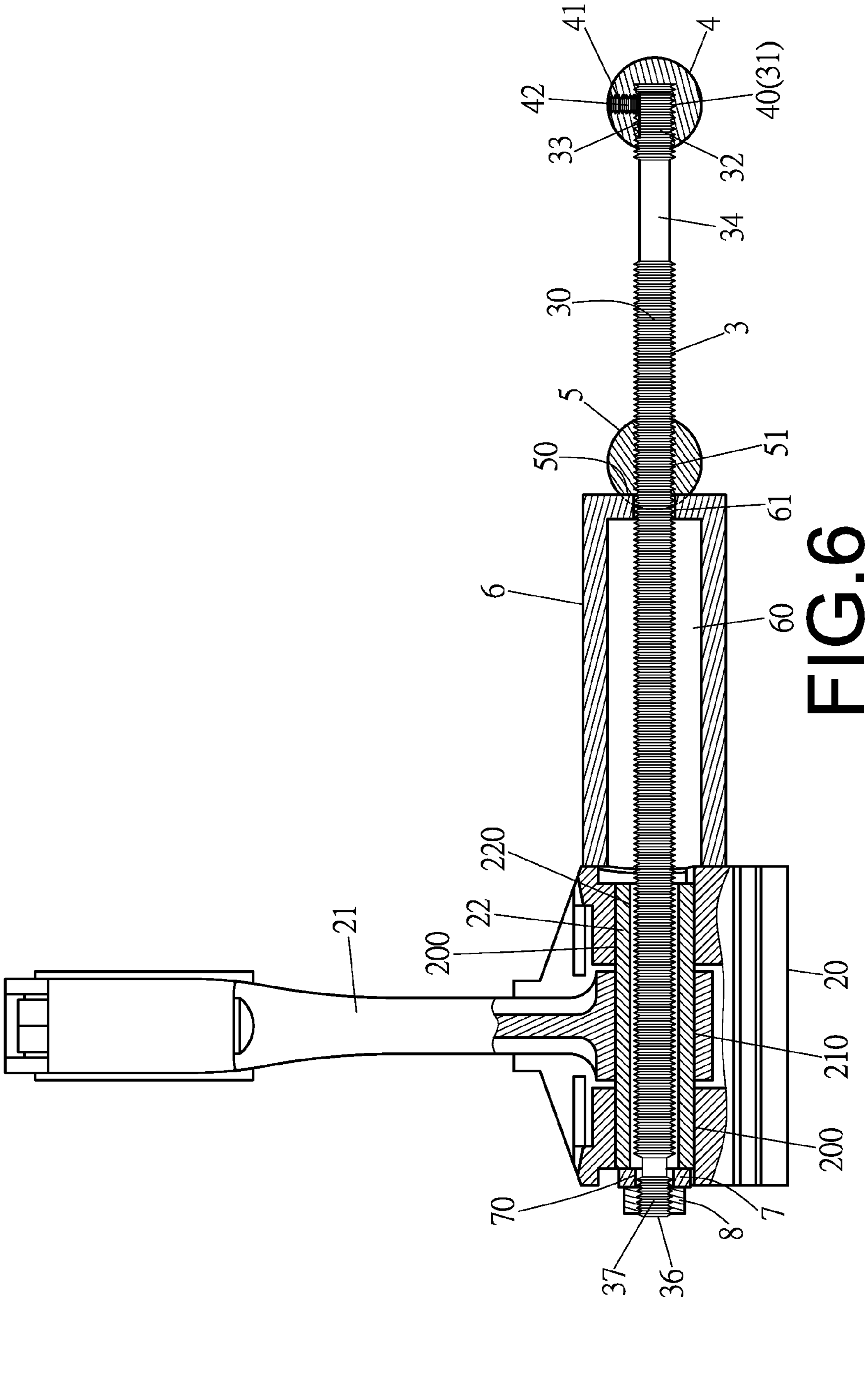
FIG. 6 is a cross-sectional view of the preferred embodiment of a tool for detaching piston bolt from cylinder in the present invention, showing it being assembled in a piston bolt.
Figure 7:
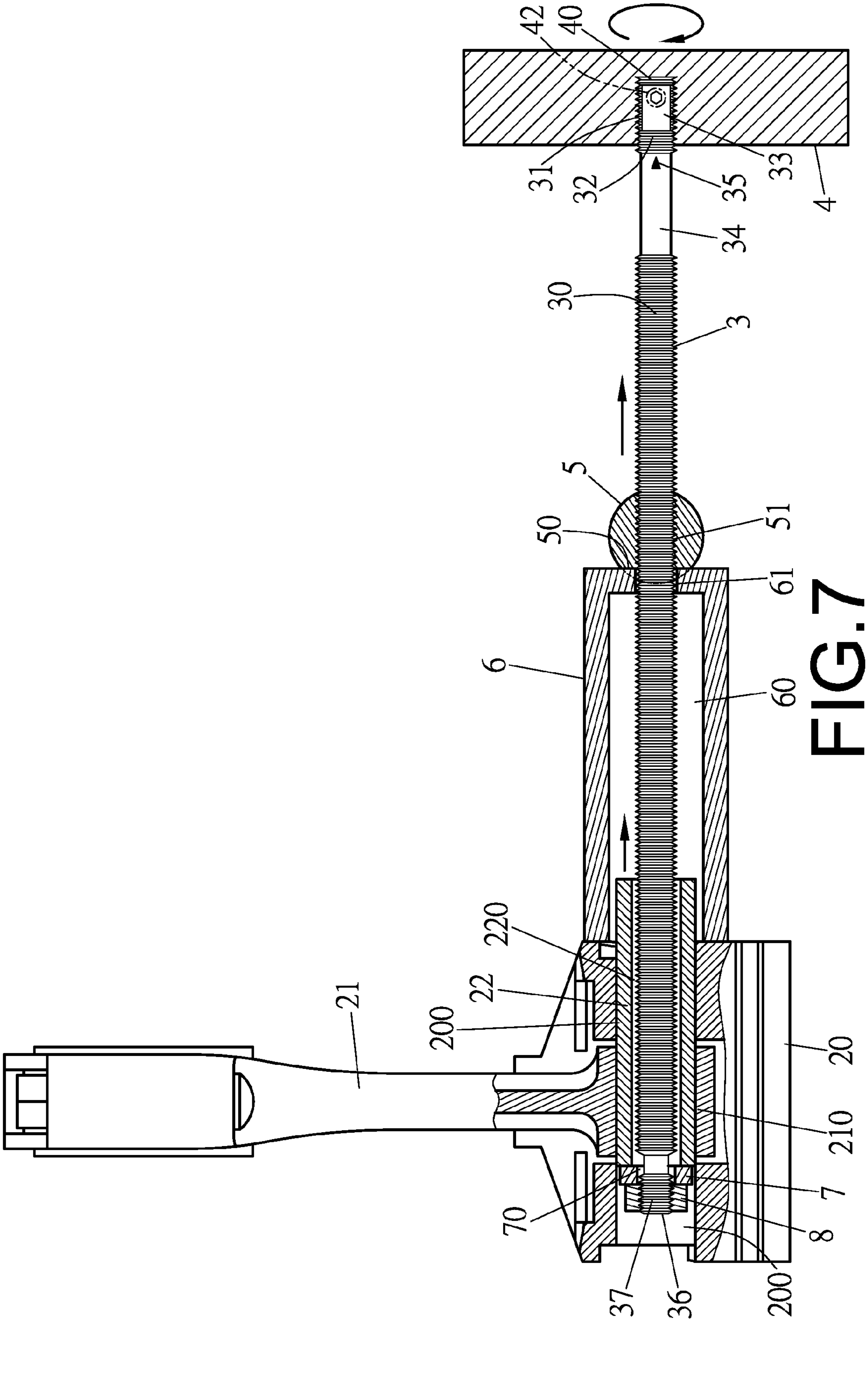
FIG. 7 is a cross-sectional view of the preferred embodiment of a tool for detaching piston bolt from cylinder in the present invention, showing the piston bolt being dragged out of a piston bolt hole.

In using, as shown in FIGS. 4~7, the nut 8 and the supporting member 7 are firstly removed from the fixing end 36 of the threaded rod 3, and the threaded rod 3 is inserted into a through hole 220 of a piston bolt 22. Next, the supporting member 7 is fitted with the fixing end 36 of the threaded rod 3 and the nut 8 is threadably engaged with the fixing end 36 of the threaded rod 3. The positioning member 5 is rotated along the threaded rod 3 to push the positioning sleeve 6 moving toward a wall of the piston 20 until attaching on it. With the supporting member 7 blocking one end of the piston bolt 22 and the positioning sleeve 6 pressing on the wall of the piston 20, the grip 4 can be grasped by a hand, as shown in FIG. 5, to drag the threaded rod 3 rotating in the threaded hole 51 of the positioning member 5 outwardly. By the time, the supporting member 7 and the nut 8 can be concurrently moved to push outward the piston bolt 22 into the accommodating groove 60 of the positioning sleeve 6, as shown in FIG. 7. As the piston bolt 22 is completely removed from the piston 20 and bolt holes 200 and 210 of the connecting rod 21, the connecting rod 21 is able to be separated from the piston 20 conveniently, without any damage to the connecting rod 21 and the piston 20. It is to be noted that, with the resting portion 34 adjacent to the grip 4 formed with no threads, a user's fingers are not to get friction with the first threads 30 of the threaded rod 3 while rotating the grip 4. Moreover, with the grip 4 fixed with the threaded rod 3 by means of the fixing screw 42, the grip 4 is not to rotate along the second threads 32 of the threaded rod 3 while being wheeled, steady and quick for a user to separate the piston 20 from the connecting rod 21.

While the preferred embodiment of the invention has been described above, it will be recognized and understood that various modifications may be made therein and the appended claims are intended to cover all such modifications that may fall within the spirit and scope of the invention.

What is claimed is:

1. A tool for detaching piston bolt from cylinder comprising:

a threaded rod provided with first threads, a joint end located at one end of said threaded rod with second threads, a fixing end located at another end of said threaded rod with third threads;

a grip threadably connected with said joint end of said threaded rod and provided with a first threaded hole;

a positioning member threadably engaged with said threaded rod and provided with a recessed flat surface, a threaded through hole bored through said recessed flat surface;

a positioning sleeve threadably engaged with said threaded rod and having one end attached on said recessed flat surface of said positioning member, an accommodating groove bored through one end of said positioning member, a through hole bored through another end of said positioning sleeve to communicate with said accommodating groove;

a supporting member fitted with said fixing end of said threaded rod and bored with a through hole;

a nut screwed with said fixing end of said threaded rod; and characterized by providing a fixing surface on said joint end of said threaded rod, a resting portion formed next to said joint end with no threads, a second threaded hole bored in said grip to vertically communicate with said first threaded hole, a fixing screw employed to threadably engage with said second threaded hole to press on said fixing surface of said threaded rod.

2. The tool for detaching piston bolt from cylinder as claimed in claim 1, wherein said resting portion of said threaded rod is marked with a symbol axially aligned with said fixing surface of said threaded rod so as to enable a fixing screw engaged with said second threaded hole of said grip to exactly press on said fixing surface of said threaded rod.

3. The tool for detaching piston bolt from cylinder as claimed in claim 1, wherein said fixing screw of said grip is provided with a hexagonal recess cut in a top.

* * * * *